Figure 1:
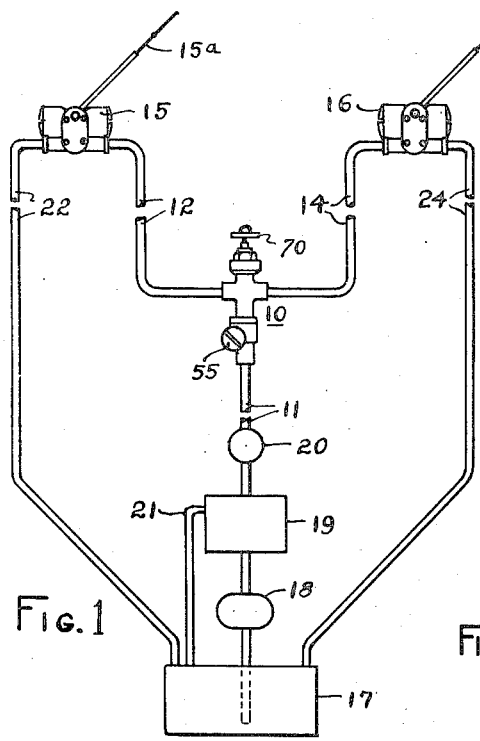

March 8, 1949.  C. R. SACCHINI  2,463,809

FLUID CONTROL AND METERING VALVE

Filed Oct. 4, 1944

INVENTOR.
COLUMBUS R. SACCHINI
BY
ATTORNEY

Patented Mar. 8, 1949

2,463,809

UNITED STATES PATENT OFFICE 2,463,809

FLUID CONTROL AND METERING VALVE

Columbus R. Sacchini, Willoughby, Ohio, assignor to The Marquette Metal Products Company, Cleveland, Ohio, a corporation of Ohio Application October 4, 1944, Serial No. 557,179

3 Claims. (Cl. 277—68)

This invention relates generally to a fluid control valve, and more particularly to a valve having an adjustable metering orifice and suitable for controlling the rate of fluid flow in a hydraulic system including fluid operated motors or the like.

Recent improvements in the efficiency of small hydraulic motors of the type used on aircraft have so reduced their rate of fluid consumption that known metering or speed control valves are not capable of accurately and reliably predetermining the rate of fluid flow to the motor or motors so as to be satisfactory for preselecting the motor speed and maintaining it substantially constant. Since circular orifices of the order of 0.015 inch in diameter are now required even when two motors are controlled by one valve, it becomes difficult to provide a needle valve having the necessary accuracy. Furthermore, needle valves of such small size become clogged easily and no convenient method of cleaning the valve after clogging is known.

For a motor of given power and efficiency, the size of the metering or speed control orifice is determined by the type of fluid (e. g. oil) used as the operating medium and the pressure of the particular hydraulic system. Since the type of oil and system pressure vary among the many different types of aircraft, it is apparent that a speed control valve provided with an adjustable metering orifice has many advantages. It is equally obvious that, as the sizes of the orifices within the required range of adjustment become smaller, it becomes increasingly difficult to provide for accurate adjustment.

In accordance with this invention a rate of flow control or metering valve having an annular orifice is disposed in series with a shut-off valve within a unitary housing, and improved means are provided for easily and accurately controlling the size of the metering orifice. The size of the orifice can be made even smaller than now required, and, because no needle is used, the possibility of clogging is reduced. Furthermore, if clogging should occur, the construction of the valve is such that the obstruction can be easily cleared and the orifice readily returned to its original adjusted size. Although obvious advantages of economy and space-saving result from including both a shut-off and a metering valve in cooperating relation in a single housing, it will become apparent as the description proceeds that either valve may be used separately within individual housings.

An object of this invention is to provide an improved valve for controlling the rate of fluid flow in a hydraulic system.

Another object is to provide an improved valve having an adjustable orifice of very small size.

A further object is to provide a metering valve having an adjustable annular orifice defined by complementary frusto-conical surfaces.

Still another object is to provide an improved valve having a shut-off valve element and an adjustable metering orifice contained within a unitary housing.

An additional object is to provide improved adjusting means for a metering valve.

Yet another object is to provide a valve having a threaded plunger provided with an integral flexible portion between the threaded portion of the plunger and a valve head formed on the plunger.

Figure 2:
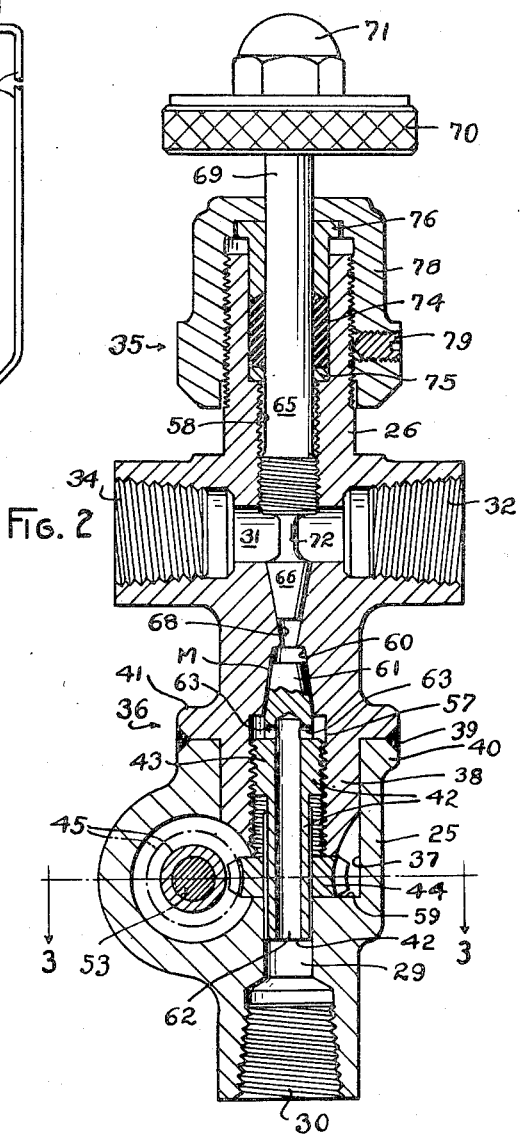
Figure 3:
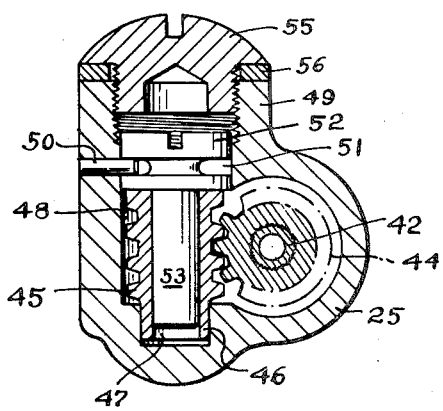

Other objects and advantages of the present invention will become apparent from the following description, wherein reference is made to the drawings, in which:

Fig. 1 is an illustrative hydraulic system incorporating the valve of this invention, Fig. 2 is a central longitudinal sectional view of the valve, and Fig. 3 is a transverse sectional view as indicated by the line 3—3 of Fig. 2.

Relative positional terms such as upper and lower are used herein for convenience and clearness only and are not to be considered restrictive since the valve will operate in any turned position.

Referring first to Fig. 1, a valve 10 shown in detail in Figs. 2 and 3 is arranged to control the rate of fluid flow from a conduit 11 into conduits 12 and 14 leading, for example, to hydraulic motors 15 and 16, respectively, which may be drivingly connected to windshield wiper blades 15a and 16a, respectively. The rate of flow of fluid through the valve 10 determines the speed of the motors 15 and 16, the motors being stopped when the valve is operated to completely stop the flow of fluid. The fluid is drawn from a sump tank 17 by a pump 18 and passes through a suitable maximum pressure delivery regulator 19 and accumulator 20 to the conduit 11. A conduit 21 serves to return excess fluid from the regulator 19 to the sump 18, and conduits 22 and 24 are arranged to return exhaust fluid from the motors 15 and 16, respectively, to the sump. The hydraulic system of Fig. 1 is a type commonly used on aircraft and illustrates one aplication for the valve of this invention.

Referring now to Figs. 2 and 3, a housing for the valve 10 comprises telescoped body members 25 and 26 which are preferably machined from light, non-magnetic alloy castings. The body 25 has an axial opening 29 extending therethrough and suitably threaded at its lower end to define an inlet port 30. The body 26, as shown, is cross-shaped, having a relatively short transverse portion provided with an opening 31 threaded at its opposite ends to define outlet ports 32 and 34. As the valve 10 is shown in Fig. 1, the inlet port 30 connects with the conduit 11 and the outlet ports 32 and 34 connect with the conduits 12 and 14, respectively.

A shut-off valve assembly 35 is contained within the body 26 and a rate of flow control or metering valve assembly 36 is contained within both of the body members 25 and 26. A lower, generally cylindrical end portion 38 of the body 26 is received within a counterbore 37 of the opening 29, and a weld 39 in a V-shaped groove defined by opposing beveled outer circumferential edge portions of abutting flanges 40 and 41 of the body members 25 and 26, respectively, secures the two body members together, thus forming a unitary housing.

The metering valve assembly 36 comprises a worm wheel 44 and a worm 45, which are preferably of commercially standardized size and type, and a valve plunger 42. The worm 45 (see Fig. 3) has a bearing portion 46 rotatably received in a reduced inner end portion of a socket 48 disposed transversely with respect to the opening 29 and entering a thickened portion of the body 25 from a boss 49. The socket 48 intersects the counterbore 37 sufficiently to permit continuous meshing engagement between the worm 45 and the worm wheel 44 which is disposed within the counterbore 37.

Axial movement of the worm 45 may be prevented by a cylindrical pin 50 pressed into an opening in the wall of the body 25 near the boss 49, the pin entering an annular groove 51 formed in the peripheral surface of a flange 52 of a stud 53 pressed into an axial bore 47 in the worm. The flange 52 preferably has a bearing fit within the socket 48. A screwdriver slot 54 preferably is formed in the outer end face (top, Fig. 3) of the stud 53 to facilitate turning of the worm 45 for adjustment of the metering valve 36, as will be described later. The socket 48 may be closed by a threaded and flanged plug 55 provided with a sealing gasket 56 of soft aluminum, for example.

The worm wheel 44 has a splined engagement with the plunger 42 and the latter has an enlarged portion 43 in threaded engagement with a lower counterbored portion 57 of an axial opening 58 extending through the body 26 and intersecting the outlet opening 31. As mentioned above, the worm wheel 44 is in constant mesh with the worm 45, and is disposed with a small amount of clearance between the lower end face of the portion 38 of the body 26 and a shoulder 59 defined by the bottom of the counterbore 37. The outer peripheral wall of the portion 38 is cut away at its lower end, as shown, to provide clearance for the worm 45.

A frustro-conical portion 60 of the opening 58 immediately above the counterbored portion 57 forms a metering valve surface facing the lower end of the opening 58 and complementary to a frusto-conical plug-like end portion or head 61 of the plunger 42. The plunger 42 has an axial passage 62 extending upwardly from the bottom and intersecting a plurality of transverse bores defining passages 63 which open into the counterbore 57 immediately adjacent to and above the threaded portion 43 of the plunger. An annular flow control or metering orifice indicated at M is defined between the valve seat 60 and the plug-like head 61, the size of the orifice depending upon the axial position of the plunger 42. Because of its usual small size, the metering orifice M is greatly exaggerated in the drawing, but it is apparent that its size is adjusted by turning the worm 45 which rotates the plunger 42 through the intermediary of the worm wheel 44, the splined connection between the worm wheel and plunger permitting the plunger to move axially as the threaded portion 43 turns in the threads of the counterbore 57. It is apparent that these threads may be made very fine to provide for extremely accurate control of the size of the orifice M upon rotation of the worm wheel 44.

The shut-off valve mechanism 35 is shown in its closed position and comprises a plunger 65 having a tapered lower end portion defining a head or plug portion 66 complementary to a frusto-conical valve seat 68 formed in the opening 58 between the valve seat 60 and the transverse opening 31 and facing toward the top of the body 26. A stem portion 69 of the plunger 65 is threaded into the opening 58 above the intersection with the opening 31 and extends outwardly from the top of the body 26. A suitable handle 70 is secured to the upper end portion of the plunger 65, shown as held in position by an acorn nut 71. The plunger 65 has a portion 72 of reduced diameter between the stem portion 69 and the tapered portion 66 which deflects, if necessary, to permit proper alignment of the head 66 with the seat 68. Consequently, it is not necessary that the threads in the upper part of the opening 58 be exactly aligned with the seat 68.

A suitable fluid-tight seal around the stem portion 69 may comprise a resilient tubular packing 74 surrounding the stem within an upper counterbored portion of the opening 58 and interposed between a stop washer 75 and a flanged sleeve 76 which is centrally disposed within a thimble-shaped adjusting nut 78 threaded over the upper end portion of the body 26. A set-screw 79 may be provided to prevent loosening of the nut 78.

The metering portion of the valve 10 preferably is assembled by placing the worm wheel 44 on the splined portion of the plunger 42, inserting the assembled plunger and worm wheel into the counterbore 57, inserting the portion 38 of the body 26 into the counterbore 37, and then effecting the weld 39. The assembly comprising the worm 45 and stud 53 is then inserted into the socket 48, causing the worm wheel 44 to turn. The direction of the threads on the worm 45 and on the plunger 42 should be such that the turning of the worm wheel 44 during assembly causes the plunger 42 to move away from the valve seat 60. After the worm 45 is properly positioned, the retainer pin 50 is pressed into the groove 51. The assembly of the shut-off valve 35 is obvious from the drawing and the previous description.

In order to adjust the size of the orifice at the conical surface 60, the worm 45 is turned as by a screw-driver until the valve head 61 is firmly seated. The worm is then turned in a reverse direction a calculated or trial-determined amount. From the reduction effected by the worm 45 and worm wheel 44 and the number of threads per inch on the threaded portion 43 of the plunger 42, the number of turns of the worm 45 required for a given size orifice can be predetermined. Preferably a calibration chart is prepared so that any desired size of orifice can be quickly obtained by counting the number of reverse rotations of the worm 45 after the valve head 61 has seated.

In event the metering orifice M becomes clogged, the plunger 42 may be retracted until a maximum orifice is obtained. The excessive fluid flowing through the orifice under these conditions should remove the foreign clogging material. Or, if necessary, the plunger 42 is moved so that the head 61 is pressed tightly against the seat 68, thereby to crush or extrude and eject the clogging material. Subsequent retraction of the plunger 42 again results in an excessive flow of fluid which easily washes away any crushed foreign matter which may have remained on the orifice constituting surfaces.

In normal operation of the valve 10, the valve 35 may be opened and closed as desired to permit unretarded fluid flow between the seat 68 and head 66 or to stop such flow entirely. Assuming that the valve 35 is open and that the metering orifice is adjusted to a predetermined size, fluid entering the port 31 from the conduit 11 (Fig. 1) flows into the passage 62, through the ports 63, the metering orifice M, the space between the head 66 and seat 68 into the opening 31, and then out of the ports 32 and 34 into the conduits 12 and 14, respectively.

I claim:

1. A fluid metering device comprising a body provided with a conical surface defining a passage, a tubular plunger having a shank screw-threaded to the body and with a conical head portion directly adjacent the threaded portion of the shank and complementary to said passage surface, the threaded portion of the shank being of larger transverse cross-section than the larger end of the head, the shank having a splined portion beyond the threaded portion in a direction away from the head, a worm wheel in direct driving splined engagement with the spline of the shank, a worm for driving said worm wheel, and abutments on the body holding the worm wheel against axial movement in the body.

2. A fluid control or metering valve comprising a body having a passage, a valve seat in the passage defined by a frusto-conical portion of the passage, a plunger threaded in the passage, the plunger having a tubular shank open at its outer end and a head portion complementary to the seat, a lateral passage adjacent the larger end of the head portion communicating with the interior of the shank to conduct fluid through the shank to the seat portion of the body passage, a worm wheel disposed in the body passage in splined engagement with said plunger shank, means restraining axial movement of the worm wheel, and a worm rotatably mounted by the body in continuous meshing engagement with the worm wheel and arranged to be rotated exteriorly of said body to drive the worm wheel.

3. A fluid control or metering valve comprising a pair of mutually telescoping rigid body members having aligned portions of a common passage, a valve seat defined by a frusto-conical region of one portion of said passage, a valve plunger having a screw threaded connection with one of said members axially of the passage and having a frusto-conical head portion complementary to said seat, axially spaced shoulders on respective body members around the axis of the passage, a driven gear maintained against axial movement by engagement with the shoulders, said gear having a splined engagement with said plunger for effecting axial movement thereof by rotation of the plunger at its screw threaded connection, and driving means meshing with said gear.

COLUMBUS R. SACCHINI.

REFERENCES CITED

The following references are of record in the file of this patent:

UNITED STATES PATENTS

| Number | Name | Date |
|---|---|---|
| 277,713 | Hambleton | May 15, 1883 |
| 684,913 | Cordell | Oct. 22, 1901 |
| 803,889 | Fox | Nov. 7, 1905 |
| 1,543,291 | Mueller | June 23, 1925 |
| 1,597,627 | Sellinger | Aug. 24, 1926 |
| 1,775,999 | Haseloff | Sept. 16, 1930 |
| 1,944,979 | Hastings | Jan. 30, 1934 |
| 2,030,332 | Spear | Feb. 11, 1936 |
| 2,130,955 | Hoffman | Sept. 20, 1938 |

FOREIGN PATENTS

| Number | Country | Date |
|---|---|---|
| 780,846 | France | 1935 |